US008936394B2

(12) United States Patent  
Kenkre et al.

(10) Patent No.: US 8,936,394 B2  
(45) Date of Patent: Jan. 20, 2015

(54) REAL-TIME ESTIMATION OF CELL CORE TEMPERATURE DURING PERIOD OF REST

(75) Inventors: Mahendra M. Kenkre, Troy, MI (US); Wei Liu, Warren, MI (US); Charles Hua, Novi, MI (US); Andrew H. Leutheuser, Sunnyvale, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 502 days.

(21) Appl. No.: 13/112,376

(22) Filed: May 20, 2011

(65) Prior Publication Data

US 2012/0128026 A1 May 24, 2012

Related U.S. Application Data

(60) Provisional application No. 61/347,942, filed on May 25, 2010.

(51) Int. Cl.
| | |
|---|---|
| *G01K 1/16* | (2006.01) |
| *H01M 10/48* | (2006.01) |
| *H01M 10/42* | (2006.01) |

(52) U.S. Cl.
CPC .......... *H01M 10/486* (2013.01); *H01M 10/425* (2013.01); *H01M 10/482* (2013.01)
USPC ............................ 374/134; 374/100; 374/141

(58) Field of Classification Search
USPC ............ 702/63; 374/141, 185, 163, 100, 170, 374/152
See application file for complete search history.

(56) References Cited

U.S. PATENT DOCUMENTS

| | | | |
|---|---|---|---|
| 5,862,515 A | 1/1999 | Kobayashi et al. | |
| 6,076,964 A * | 6/2000 | Wu et al. ................. | 374/141 |
| 6,137,269 A * | 10/2000 | Champlin ................ | 320/150 |
| 7,059,769 B1 | 6/2006 | Potega | |
| 7,155,075 B2 | 12/2006 | Rajendran et al. | |
| 7,324,902 B2 | 1/2008 | Verbrugge et al. | |
| 7,456,605 B2 | 11/2008 | Nakasho et al. | |
| 7,660,694 B2 * | 2/2010 | Wu et al. ................. | 702/130 |
| 2002/0011822 A1 * | 1/2002 | Sakai et al. .............. | 320/134 |
| 2005/0231169 A1 | 10/2005 | Seo et al. | |
| 2005/0275383 A1 | 12/2005 | Ishishita | |
| 2007/0072060 A1 | 3/2007 | Chang et al. | |
| 2007/0139017 A1 * | 6/2007 | Marchand et al. ....... | 320/150 |
| 2010/0309949 A1 | 12/2010 | Akaboshi et al. | |
| 2012/0099618 A1 | 4/2012 | Nishi et al. | |
| 2012/0109554 A1 | 5/2012 | Lin et al. | |
| 2012/0128026 A1 | 5/2012 | Kenkre et al. | |

* cited by examiner

*Primary Examiner* — Lisa Caputo  
*Assistant Examiner* — Janice M Soto  
(74) *Attorney, Agent, or Firm* — Dinsmore & Shohl LLP

(57) ABSTRACT

Methods and systems for estimating the core temperature of at least one cell in a battery at the termination of a rest period. The method for estimating the core temperature of the cells in a battery includes measuring the surface temperature of the cells, obtaining the estimated core temperature of the cells, obtaining the time required for the surface temperature and the estimated core temperature of the cells to converge, and estimating the core temperature of the cells based on the measured surface temperatures, the obtained estimated core temperature, and the obtained time. The system for estimating the core temperature of the cells in a battery includes at least one sensor configured to receive temperature information and a control system in signal communication with the sensor, wherein the control system comprises a memory device and a controller.

18 Claims, 4 Drawing Sheets

REAL-TIME ESTIMATION OF CELL CORE TEMPERATURE DURING PERIOD OF REST

This application claims priority to U.S. Provisional Application Ser. No. 61/347,942, filed May 25, 2010.

TECHNICAL FIELD

The present disclosure relates to methods and systems for estimating the core temperature of at least one cell in a battery. More specifically, the present disclosure relates to methods and systems for estimating the core temperature of at least one cell in a battery at the termination of a rest period.

BACKGROUND

The increasing demand to improve vehicular fuel economy and reduce vehicular emissions has led to the development of both hybrid vehicles and pure electric vehicles. Pure electric vehicles may be powered by a battery pack (which is made up of numerous smaller modules or cells), while hybrid vehicles include two or more energy sources, such as a gasoline (also referred to as an internal combustion) engine used as either a backup to or in cooperation with a battery pack. There are two broad versions of hybrid vehicles currently in use. In a first version (known as a charge-depleting hybrid architecture), the battery can be charged off a conventional electrical grid such as a 120 VAC or 240 VAC power line. In a second version (known as a charge-sustaining hybrid architecture), the battery receives all of its electrical charging from one or both of the internal combustion engine and regenerative braking. In either configuration, various parameters associated with the battery pack can be monitored to ensure proper operation.

The determination of the temperature of a cell in a battery (or battery pack) is required to predict a variety of operating parameters in a vehicle powered by such battery. For example, the temperature of a cell in a battery is required to determine the available capacity of the battery. While one method of determining the temperature of a cell in a battery is to put a sensor in contact with the core of the cell in a battery, this method is generally available only in a laboratory setting, as it is placed in a sealed area of the battery that would be inaccessible in a production environment. As a result, the temperature of a cell in a battery is currently determined by directly measuring the temperature of the surface of the cell with a sensor. However, the temperature of the surface of a cell in a battery is often different from the temperature of the core of a cell in a battery.

For instance, the surface temperature of a cell in a battery and the core temperature of a cell in a battery naturally change during a rest period wherein the cell is neither charging nor discharging. Specifically, the surface temperature and the core temperature of the cell will naturally converge to the ambient temperature during a rest period. However, if the rest period is terminated before the surface temperature and the core temperature of the cell converge to the ambient temperature, the surface temperature and the core temperature of the cell will be different. As a result, the use of the surface temperature as a representation of the core temperature may introduce error into calculations involving the temperature of a cell in a battery.

SUMMARY

According to one embodiment, a method of estimating the core temperature of at least one cell in a battery at the termination of a rest period is provided. The method comprises measuring the surface temperature of the cell at the initiation of the rest period and at the termination of the rest period, obtaining the estimated core temperature of the cell at the initiation of the rest period, obtaining the time required for the surface temperature of the cell at the initiation of the rest period and the estimated core temperature of the cell at the initiation of the rest period to converge, and estimating the core temperature of the cell at termination of the rest period based on the measured surface temperatures, the obtained estimated core temperature, and the obtained time.

Optionally, the initiation of the rest period may comprise key-off and the termination of the rest period may comprise key-on.

Optionally, the method may further comprise measuring the time from the initiation of the rest period to the termination of the rest period and applying it to the method such that the estimated core temperature of the at least one cell at the termination of the rest period is additionally based on the measured time. In one aspect, the measured time may be less than the obtained time. In another aspect, the estimated core temperature of the at least one cell at the termination of the rest period may be characterized by the following relationship:

$$\left\{ T_{est}(t_{off}) = (T_{est}(0) - T_{sur}(0))\left(1 - \frac{t_{off}}{t_{stable}}\right) + T_{sur}(t_{off}) \right.$$

wherein $T_{est}(t_{off})$ is the estimated core temperature of the cells at termination of the rest period, $T_{est}(0)$ is the estimated core temperature of the cells at initiation of the rest period, $T_{sur}(0)$ is the surface temperature of the cells at initiation of the rest period, $t_{off}$ is the rest period, $t_{stable}$ is the time required for the surface temperature of the cells at the initiation of the rest period and the estimated core temperature of the cells at the initiation of the rest period to converge, and $T_{sur}(t_{off})$ is the surface temperature of the cells at termination of the rest period.

Optionally, the surface temperature and the estimated core temperature at initiation of the rest period may converge at the ambient temperature. In one aspect, the surface temperature and the estimated core temperature at the initiation of the rest period may decrease or increase from the initiation to the termination of the rest period. In another aspect, the surface temperature at initiation of the rest period may be higher than the estimated core temperature at initiation of the rest period.

Optionally, the surface temperatures may be measured with a sensor.

In another embodiment, the present disclosure relates to a method of estimating the core temperature of at least one cell in a battery at the termination of a rest period in real-time. The method comprises measuring the surface temperature of the cell at the initiation of the rest period and at the termination of the rest period, obtaining the estimated core temperature of the cell at the initiation of the rest period, obtaining the time required for the surface temperature of the cell at the initiation of the rest period and the estimated core temperature of the cell at the initiation of the rest period to converge, measuring the time from the initiation of the rest period to the termination of the rest period, and estimating the core temperature of the cell at termination of the rest period based on the measured surface temperatures, the obtained estimated core temperature, and the obtained time.

Optionally, the surface temperature and the estimated core temperature at initiation of the rest period may converge at the ambient temperature. Additionally, the surface temperature may be lower than the estimated temperature at initiation of the rest period, and the surface temperature and the estimated core temperature at the initiation of the rest period may decrease from the initiation of the rest period to the termination of the rest period.

In another embodiment, the present disclosure relates to a system for estimating the core temperature of at least one cell in a battery in a vehicle at the termination of a rest period, wherein the vehicle receives at least a portion of its power from the battery. The system comprises at least one sensor configured to measure the surface temperature of the at least one cell, and a control system in signal communication with the sensor, wherein the control system comprises a memory device and a controller with instructions for estimating the core temperature of at least one cell in the battery at the termination of the rest period. The instructions are written to measure the surface temperature of the cell at the initiation of the rest period and at the termination of the rest period, obtain the estimated core temperature of the cell at the initiation of the rest period, obtain the time required for the surface temperature at the initiation of the rest period and the estimated core temperature at the initiation of the rest period to converge, and estimate the core temperature at the termination of the rest period based on the measured surface temperatures, the obtained estimated core temperature, and the obtained time.

Optionally, the initiation of the rest period may comprise key-off and the termination of the rest period may comprise key-on.

Optionally, the system may further comprise a timing device in signal communication with the controller. Additionally, in one aspect, the instructions may be further written to measure the time from the initiation of the rest period to the termination of the rest period, such that the estimated core temperature of the at least one cell at the termination of the rest period is based on the measured surface temperatures, the obtained estimated core temperature, the obtained time, and the measured time. In another aspect, the measured time may be less than the obtained time.

Optionally, the system may comprise instructions written to estimate the core temperature of the at least one cell at the termination of the rest period characterized by the following relationship:

$$\left\{ T_{est}(t_{off}) = (T_{est}(0) - T_{sur}(0))\left(1 - \frac{t_{off}}{t_{stable}}\right) + T_{sur}(t_{off}) \right.$$

wherein $T_{est}(t_{off})$ is the estimated core temperature of the cells at termination of the rest period, $T_{est}(0)$ is the estimated core temperature of the cells at initiation of the rest period, $T_{sur}(0)$ is the surface temperature of the cells at initiation of the rest period, $t_{off}$ is the rest period, $t_{stable}$ is the time required for the surface temperature of the cells at the initiation of the rest period and the estimated core temperature of the cells at the initiation of the rest period to converge, and $T_{sur}(t_{off})$ is the surface temperature of the cells at termination of the rest period.

Optionally, the system for estimating the core temperature of at least one cell in a battery may be incorporated into a vehicle.

These and other features and advantages of these and other various embodiments according to the present disclosure will become more apparent in view of the drawings, detailed description, and claims provided that follow hereafter.

BRIEF DESCRIPTION OF THE DRAWINGS

The embodiments set forth in the drawings are illustrative and exemplary in nature and not intended to limit the subject matter defined by the claims. The following detailed description of the embodiments of the present disclosure can be best understood when read in conjunction with the following drawings, where like structure is indicated with like reference numerals, and in which:

DETAILED DESCRIPTION

Figure 1:
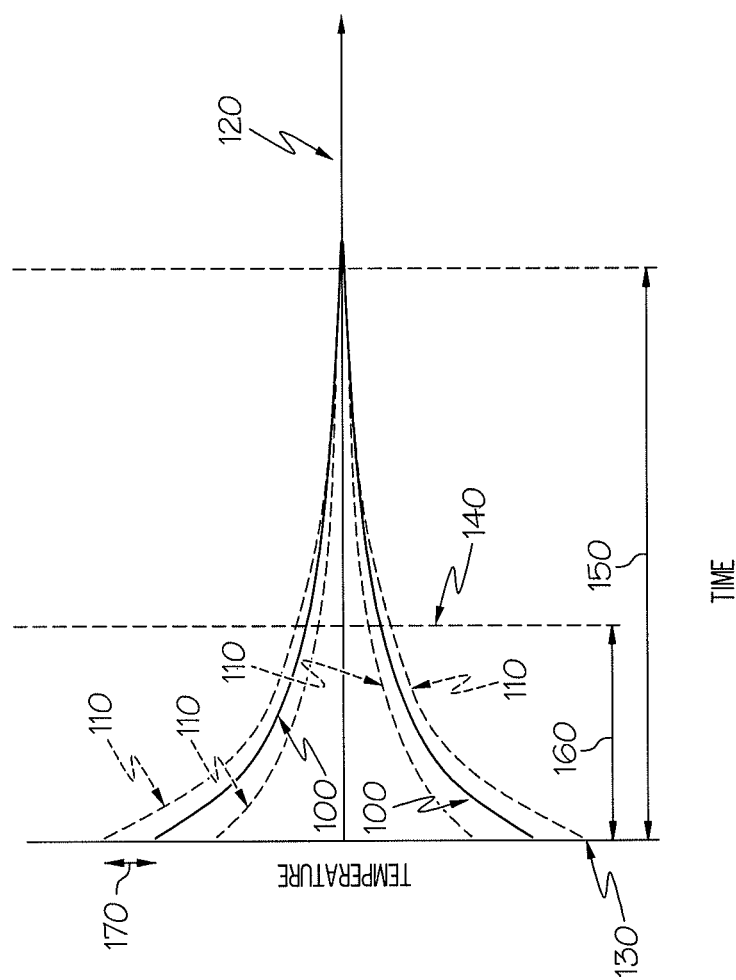
FIG. 1 is a graph of temperature versus time which depicts the relationship between the surface temperature of at least one cell in a battery and the core temperature of at least one cell in a battery during a rest period in accordance with at least one of the embodiments of the present disclosure.

The following terms are used in the present application:

The term "rest period" is used herein to refer to a period of time wherein the cells in a battery are neither charging nor discharging. In the context of a vehicle, in one particular aspect, the rest period refers to a period of time wherein the vehicle is turned off such that the cells in the battery are neither charging nor discharging.

The terms "charging", "charge" and "charged" are used herein to refer to a state wherein the controller initiates the conversion of electrical energy to chemical energy of the battery.

The terms "discharging", "discharge" and "discharged" are used herein to refer to a state wherein the controller initiates the conversion of chemical energy of the battery to electrical energy.

In the context of the rest period, the term "initiation" is used herein to refer to the time at which the rest period begins. In one particular aspect, initiation refers to the time at which the controller ceases to initiate charging or discharging the cells of the battery. In the context of a vehicle, initiation refers to the time at which the key is turned to the off position such that controller ceases to initiate charging or discharging the cells of the battery, or "key-off."

Similarly, in the context of the rest period, the term "termination" is used herein to refer to the time at which the rest period ends. In one particular aspect, termination refers to the time at which the controller initiates charging or discharging the cells of the battery. In the context of a vehicle, termination refers to the time at which the key is turned from the off position to a position wherein the controller initiates charging or discharging the cells of the battery, or "key-on." For example, the key may be turned from the off position to the on position or to any of the accessory positions.

The terms "obtaining", "obtain" and "obtained" are used herein to refer to receiving a signal which conveys information. In one particular aspect, the signal conveys information related to the estimated core temperature and/or the time required for the surface temperature and the estimated core temperature to converge.

The term "signal" is used herein to refer to electrical signals via conductive medium, electromagnetic signals via air, optical signals via optical waveguides, and the like.

The term "real-time" is used herein to refer to the present estimation of the core temperature of at least one cell in a battery. For example, the core temperature of at least one cell in a battery is estimated in real-time without delay such that the estimation accurately reflects the present temperature of the core of the cells in the battery at the termination of the rest period.

The term "signal communication" is used herein to refer the process by which a signal conveying information is transmitted and/or received. In one particular aspect, signal communication refers to the process by which the controller transmits and/or receives electrical signals which convey information. In a further aspect, the signal conveys information related to the surface temperatures, the estimated core temperature, the time required for the surface temperature and the estimated core temperature to converge, and/or the time from the initiation of the rest period to the termination of the rest period.

Embodiments of the present disclosure relate to methods and systems for estimating the core temperature of at least one cell in a battery at the termination of a rest period. In one embodiment, a method of estimating the core temperature of at least one cell in a battery at the termination of a rest period is provided. The method comprises measuring the surface temperature of the cell at the initiation of the rest period and at the termination of the rest period, obtaining the estimated core temperature of the cell at the initiation of the rest period, obtaining the time required for the surface temperature of the cell at the initiation of the rest period and the estimated core temperature of the cell at the initiation of the rest period to converge, and estimating the core temperature of the cell at termination of the rest period based on the measured surface temperatures, the obtained estimated core temperature, and the obtained time.

Figure 3A:
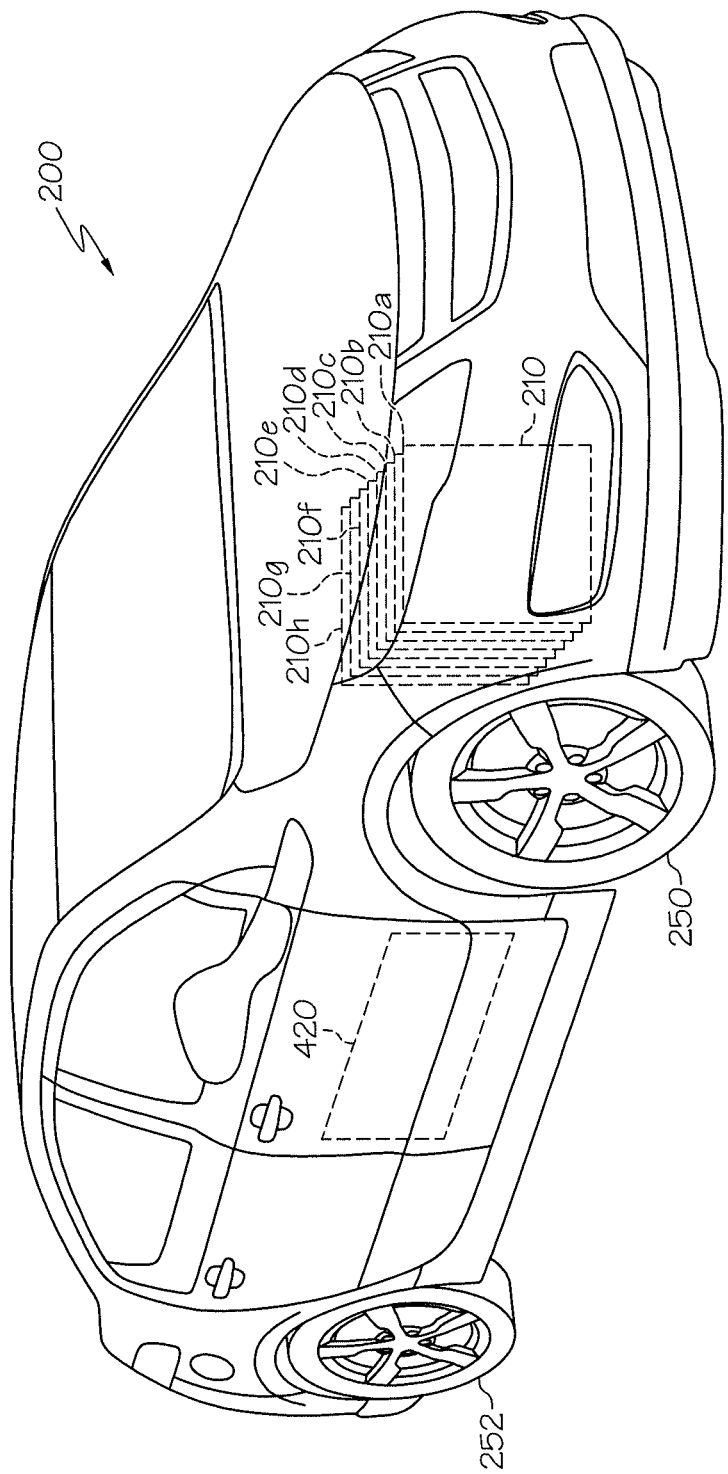
FIG. 3A depicts a vehicle employing a system for estimating the core temperature of at least one cell in a battery in accordance with at least one embodiment of the present disclosure.
Figure 3B:
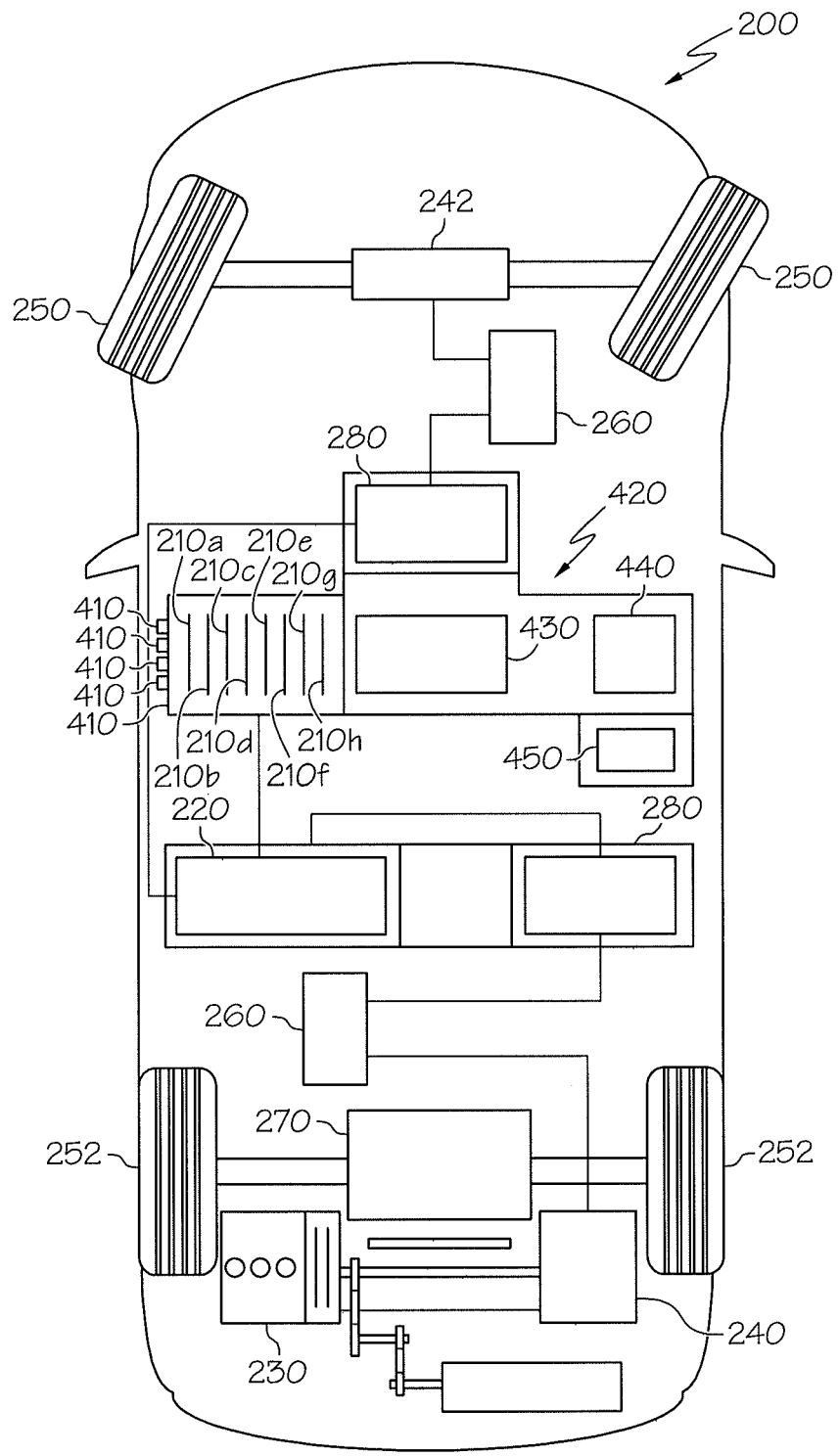
FIG. 3B depicts a vehicle platform with a diagrammatic representation of various components that provide motive power thereto, as well as the system for estimating the core temperature of at least one cell in a battery used to provide at least a portion of such motive power.

Referring to FIGS. 1 and 3B, in one aspect, the method for estimating the core temperature 110 of at least one cell in a battery 210 at the termination 140 of a rest period 160 comprises measuring the surface temperature 100 of the at least one cell at the initiation 130 of the rest period 160 and at the termination 140 of the rest period 160. In one particular aspect, the battery 210 comprises at least one cell 210a-210h, wherein the cells 210a-210h comprise a surface and a core. It is understood by one of ordinary skill in the art that the method for estimating the core temperature 110 may be performed with cells 210a-210h of any shape, size, and connectivity. For example, the shape of the cells 210a-210h may comprise a substantially cylindrical shape and/or a substantially prismatic shape. Additionally, the connectivity of the cells 210a-210h may comprise parallel circuitry or series circuitry. Further, it is understood by one of ordinary skill in the art that the method for estimating the core temperature 110 of the cells 210a-210h may be performed with batteries 210 of any type, including but not limited to, lithium-ion batteries and lead-acid batteries.

In a further aspect, the surface temperatures 100 of the cells 210a-210h are measured at the initiation 130 of the rest period 160 and at the termination 140 of the rest period 160 with at least one sensor 410. The sensor 410 may comprise any device which is capable of measuring the surface temperature 100 of cells 210a-210h in the battery 210. In one particular aspect, the sensor 410 comprises a thermistor.

In another aspect, the method for estimating the core temperature of at least one cell in a battery 210 at the termination 140 of a rest period 160 comprises obtaining the estimated core temperature 110 of the cells 210a-210h at the initiation 130 of the rest period 160. In one particular aspect, the estimated core temperatures 110 of the cells 210a-210h at the initiation 130 of the rest period 160 are obtained by receiving a signal which conveys information related to the estimated core temperature 110. The core temperature 110 of the cells at the initiation 130 of the rest period 160 may be estimated in accordance with any methods known in the art. In one particular aspect, the core temperature 110 is dynamically estimated by simple external measurements as described in commonly-owned U.S. application Ser. No. 13/112,541, filed May 20, 2011, the contents of which are fully incorporated by reference herein. In one form, the core temperature 110 is dynamically estimated based on the surface temperature of the cells, the current of the cells, and the voltage of the cells.

In yet another aspect, the method for estimating the core temperature 110 of at least one cell in a battery 210 at the termination 140 of a rest period 160 comprises obtaining the time required for the surface temperature 100 of the cell at the initiation 130 of the rest period 160 and the estimated core temperature 110 of the cell at the initiation 130 of the rest period 160 to converge 150. In one particular aspect, the time required for the surface temperature 100 and the estimated core temperature 110 to converge 150 is obtained by receiving a signal which conveys information related to the time required for the surface temperature 100 and the estimated core temperature 110 to converge 150. As shown in FIG. 1, the surface temperature 100 of the cell at the initiation 130 of the rest period 160 and the estimated core temperature 110 of the at least one cell at the initiation 130 of the rest period 160 converge at the ambient temperature 120. The time for the surface temperature 100 and the estimated core temperature 110 to converge 150 is a constant dependent upon the size and shape of the cells. Thus, the time required for the surface temperature 100 and the estimated core temperature 110 to converge 150 may be determined via experimentation.

In one aspect, the time required for the surface temperature 100 and the estimated core temperature 110 to converge 150 may be measured by placing a sensor onto the surface of a cell wherein the surface temperature is approximately the same as the core temperature. The time required for the surface temperature 100 and the estimated core temperature 110 to converge may be determined for only one cell 210a-210h and applied to the remaining cells 210a-210h wherein the cells 210a-210h have similar packaging in the battery 210. This is because heat loss is dependent upon the heat transfer characteristics of the packaging environment of the cell 210a-210h and the packaging environment of the battery 210 in the vehicle 200. This is advantageous in that the number of sensors 410 utilized to measure the time required for the surface temperature 100 and the estimated core temperature 110 to converge may be reduced. In one aspect, the time required for the surface temperature 100 and the estimated core temperature 110 to converge may be saved as calibration data, i.e. the time required to converge may be stored in a memory device 430 such as a nonvolatile memory device.

In yet still another aspect, the method for estimating the core temperature of at least one cell in a battery 210 at the termination 140 of a rest period 160 comprises estimating the core temperature 110 of the cell at termination 140 of the rest period 160 based on the measured surface temperatures, the obtained estimated core temperature, and the obtained time.

Referring to FIG. 3B, the method for estimating the core temperature of at least one cell in a battery 210 at the termination 140 of a rest period 160 may further comprise measuring 60 the time from the initiation 130 of the rest period 160 to the termination 140 of the rest period 160, wherein the core temperature 110 of the at least one cell at the termination 140 of the rest period 160 is estimated based on the measured surface temperatures, the obtained estimated core temperatures, the obtained time, and the measured time. In one particular aspect, the time from the initiation 130 of the rest period 160 to the termination 140 of the rest period 160 is measured with a timing device 450 capable of measuring increments of time from the initiation 130 of the rest period 160 to the termination 140 of the rest period 160. The timing device 450 may comprise any device which is capable of measuring the time from the initiation 130 of the rest period 160 to the termination 140 of the rest period 160.

As previously described, cells 210a-210h in a battery 210 naturally change temperature in situations where their surface temperatures 100 and their core temperatures 110 differ from that of the ambient temperature 120, such as during a rest period 160 wherein the cells are being neither charged nor discharged. As shown in FIG. 1, the cells 210a-210h will cool down when the ambient temperature 120 is lower than the surface temperature 100 and the core temperature 110 of the cells. Conversely, the cells 210a-210h will heat up when the ambient temperature 120 is higher than the surface temperature 100 and core temperature 110 of the cells 210a-210h. It will be appreciated by one of ordinary skill in the art that such a graph could depict only half of the graph of FIG. 1 wherein the ambient temperature 120 is lower than the surface temperature 100 and the core temperature 110 of the cells. Alternatively, it will also be appreciated by one of ordinary skill in the art that such a graph could depict only half of the graph of FIG. 1 wherein the ambient temperature 120 is higher than the surface temperature 100 and core temperature 110 of the cells 210a-210h. The thermal process wherein the cells 210a-210h in the battery 210 naturally change temperature when they are being neither charged nor discharged is characterized by the following relationships:

$$\begin{cases} \tau_{T_{sur}} \dfrac{d(T_{sur}(t_{off}))}{dt_{off}} + T_{sur}(t_{off}) = T_{ambient} & \text{if } t_{off} < t_{stable} \\ T_{sur}(t_{off}) = T_{ambient} & \text{if } t_{off} \geq t_{stable} \end{cases} \quad (1)$$

wherein $\tau_{T_{sur}}$ is a thermal dynamic time constant for natural decay of surface temperature 100 of the cells 210a-210h, $T_{ambient}$ is the ambient temperature 120, $T_{sur}(t_{off})$ is the surface temperature 100 of the cells 210a-210h at termination 140 of the rest period 160, $t_{off}$ is the rest period 160, and $t_{stable}$ is the time required for the surface temperature 100 of the cells at the initiation 130 of the rest period 160 and the estimated core temperature 110 of the cells at the initiation 130 of the rest period 160 to converge 150. As indicated by the equations (1), where $t_{off}$ is greater than or equal to $t_{stable}$, the surface temperature 100 of the cells 210a-210h at termination 140 of the rest period 160 is equal to the ambient temperature 120. By solving the differential equations (1), the equation (2) is determined:

$$T_{sur}(t_{off}) = T_{sur}(0)\exp(-t_{off}/\tau_{T_{sur}}) + T_{ambient}(1 - \exp(-t_{off}/\tau_{T_{sur}})) \quad (2)$$

$$= T_{ambient} + (T_{sur}(0) - T_{ambient})\exp(-t_{off}/\tau_{T_{sur}})$$

wherein $\tau_{T_{sur}}$, $t_{off}$, $T_{ambient}$, and $T_{sur}(t_{off})$ are as described above, and wherein $T_{sur}(0)$ is the surface temperature 100 of the cells 210a-210h at initiation 130 of the rest period 160. The thermal process characterized by the above equations is depicted in FIG. 1.

Based on the equations (1) and (2), the core temperature 110 of the at least one cell in a battery 210 at the termination 140 of a rest period 160 is estimated in accordance with the following relationships:

$$\begin{cases} T_{est}(t_{off}) = (T_{est}(0) - T_{sur}(0))\left(1 - \dfrac{t_{off}}{t_{stable}}\right) + T_{sur}(t_{off}) & \text{if } t_{off} < t_{stable} \\ T_{est}(t_{off}) = T_{sur}(t_{off}) & \text{if } t_{off} \geq t_{stable} \end{cases} \quad (3)$$

wherein $t_{off}$, $t_{stable}$, $T_{sur}(t_{off})$, $T_{sur}(0)$ are as described above, and wherein $T_{est}(t_{off})$ is the estimated core temperature 110 of the cells 210a-210h at termination 140 of the rest period 160, and $T_{est}(0)$ is the estimated core temperature 110 of the cells 210a-210h at initiation 130 of the rest period 160. As indicated by the equations (3), where $t_{off}$ is greater than or equal to $t_{stable}$, the estimated core temperature 110 of the cells 210a-210h at termination 140 of the rest period 160 is equal to the surface temperature 100 of the cells 210a-210h at termination 140 of the rest period 160.

As shown in FIG. 1, the surface temperature 100 of the cells 210a-210h at initiation 130 of the rest period 160 and the estimated core temperature 110 of the cells 210a-210h at initiation 130 of the rest period 160 converge at the ambient temperature 120 after a certain length of time 150. Additionally, the estimated core temperature 110 of the cells 210a-210h at the termination 140 of the rest period 160 is equivalent to the ambient temperature 120 wherein the rest period 160 is greater than or equal to the time required for the surface temperature 100 of the cell at the initiation 130 of the rest period 160 and the estimated core temperature 110 of the cell at the initiation 130 of the rest period 160 to converge 150, i.e. the obtained time. Conversely, the estimated core temperature 110 of the cells at the termination 140 of the rest period 160 is not equivalent to the ambient temperature 120 wherein the rest period 160 is less than the obtained time 150. Thus, in the situation wherein the rest period 160 is less than the obtained time 150, the estimated core temperature 110 of the cells at the termination 140 of the rest period 160 is determined via the relationship expressed in the equations (3).

In one aspect, the surface temperature 100 of the cells 210a-210h at the initiation 130 of the rest period 160 may be higher than the estimated core temperature 110 of the cells 210a-210h at the initiation 130 of the rest period 160. For example, if air with a temperature higher than the core temperature of the cells passes over the surface of the cells, the surface temperature 100 of the cells may be higher than the estimated core temperature 110. Conversely, in an alternative aspect, the surface temperature 100 of the cells 210a-210h at the initiation 130 of the rest period 160 may be lower than the estimated core temperature 110 of the cells at the initiation 130 of the rest period 160. For example, the cells in a battery heat up when the cells are charging and/or discharging; as a result, the surface temperature 100 at the initiation 130 of the rest period 160 may be lower than the estimated core temperature 110 at the initiation 130 of the rest period 160.

Particularly, the method of estimating the core temperature of the cells 210a-210h at the termination 140 of the rest period 160 is performed in real-time, such that the estimated core temperature 110 of the cells 210a-210h occurs substantially contemporaneously with the operation of the battery pack 210. The real-time estimation provides an accurate portrayal of the core temperature 110 of the cells 210a-210h in a battery 210 at the termination 140 of the rest period 160.

It is understood by one of ordinary skill in the art that the method of estimating the core temperature 110 of at least one cell in a battery 210 may be envisioned as a multi-step process. Moreover, the steps of the method of estimating the core temperature 110 of at least one cell in a battery 210 may be performed in any order such that the core temperature 110 of the cells 210a-210h is estimated as described above. More particularly, the steps of measuring the surface temperature 100 of the cells 210a-210h at the initiation 130 of the rest period 160 and at the termination 140 of the rest period 160, obtaining the estimated core temperature 110 of the cells at the initiation 130 of the rest period 160, obtaining the time required for the surface temperature 100 and the core temperature 110 at initiation 130 of the rest period 160 to converge 150, and measuring the time from the initiation 130 of the rest period 160 to the termination 140 of the rest period 160 may be performed in any order such that the core temperature 110 may be estimated based on the measured surface temperatures 100, the obtained estimated core temperature 110, the obtained time 150, and the measured time 160. In an alternative aspect, the steps of measuring the surface temperatures 100, obtaining the estimated core temperature 110, obtaining the time required for the surface temperature 100 and the core temperature 110 to converge 150, and measuring the time from the initiation 130 of the rest period 160 to the termination 140 of the rest period 160 may be performed substantially simultaneously such that the core temperature 110 may be estimated based on the measured surface temperatures 100, the obtained estimated core temperature 110, the obtained time 150, and the measured time 160.

In another embodiment, a method of estimating the core temperature 110 of at least one cell in a battery 210 at the termination 140 of a rest period 160 in real-time is provided. The method comprises measuring the surface temperature 100 of the cells 210a-210h, obtaining the estimated core temperature 110 of the cells, obtaining the time required for the surface temperature 100 of the cells 210a-210h and the estimated core temperature 110 of the cells 210a-210h to converge 150, measuring the time from the initiation 130 of the rest period 160 to the termination 140 of the rest period 160, and estimating the core temperature of the cells 210a-210h based on the measured surface temperatures 100, the obtained estimated core temperature 110, the obtained time 150, and the measured time 160. In this embodiment, the steps of the method of estimating the core temperature 110 of at least one cell in a battery 210 are performed as described above.

Figure 2:
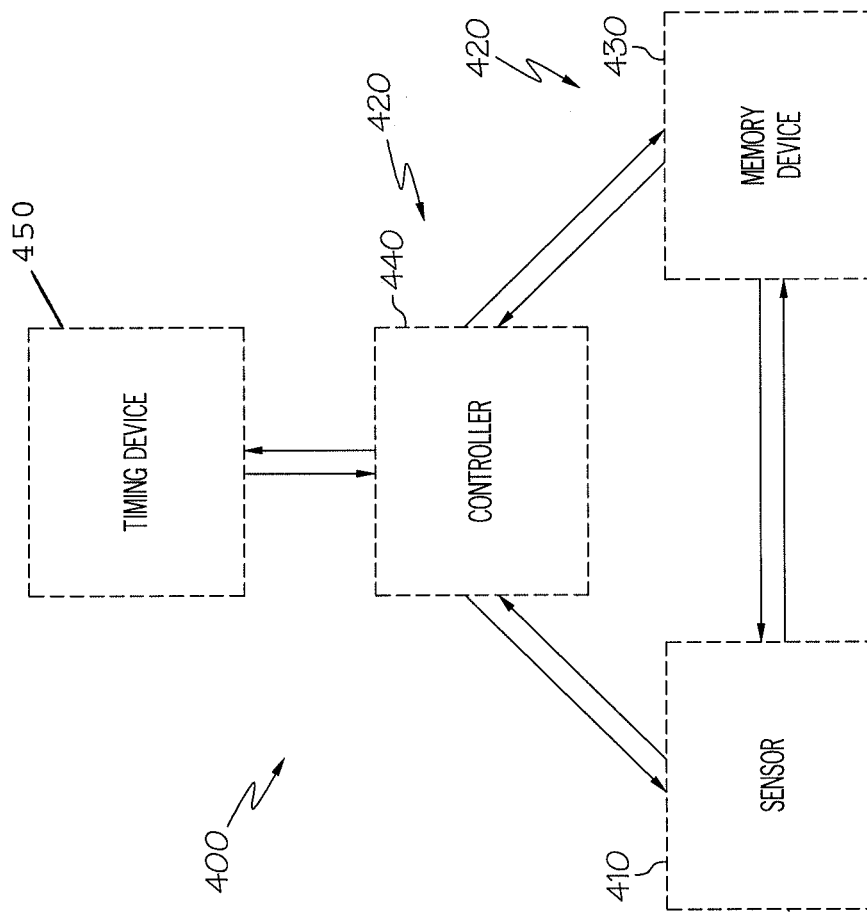
FIG. 2 is a schematic illustration of a system for estimating the core temperature of at least one cell in a battery at the termination of a rest period in accordance with at least one embodiment of the present disclosure.

Referring to FIGS. 2, 3A, and 3B, in yet another embodiment, a system 400 for estimating the core temperature 110 of at least one cell in a battery 210 in a vehicle 200 at the termination of a rest period 160 is provided, wherein the vehicle 200 receives at least a portion of its power from the battery 210 that is made up of cells 210a-210h. The system 400 comprises at least one sensor 410 configured to measure the surface temperature 100 of the at least one cell, and a control system 420 in signal communication with the sensor 410, wherein the control system 420 comprises a memory device 430 and a controller 440 in signal communication with the memory device 430 with instructions for estimating the core temperature 110 of at least one cell in the battery 410 at the termination 140 of the rest period 160. The instructions are written to measure the surface temperature 100 of the cell at the initiation 130 of the rest period 160 and at the termination 140 of the rest period 160, obtain the estimated core temperature 110 of the cell at the initiation 130 of the rest period 160, obtain the time required for the surface temperature 100 at the initiation 130 of the rest period 160 and the estimated core temperature 110 at the initiation 130 of the rest period 160 to converge 150, and estimate the core temperature 110 at the termination 140 of the rest period 160 based on the measured surface temperatures, the obtained estimated core temperature, and the obtained time.

In one aspect, the system 400 for estimating the core temperature of at least one cell in a battery 210 is provided in a vehicle 200. The battery 210 and the cells 210a-210h are as described above. As shown in FIGS. 3A and 3B, in one particular aspect, the vehicle 200 may comprise any vehicle wherein the vehicle receives at least a portion of its power from the battery 210. For example, in one aspect, the vehicle 200 comprises a hybrid vehicle, an electric vehicle, an electric hybrid vehicle, or a fuel-powered vehicle. In an alternative aspect, the system 400 for estimating the core temperature 110 of at least one cell is provided in devices other than a vehicle, wherein the device derives at least a portion of its power from the battery 210.

It is understood by one of ordinary skill in the art that the vehicle 200 may comprise, in addition to battery 210, a hybrid system controller 220, an internal combustion engine 230, a plurality of motion generating means 240, 242, a front and rear wheel set 250, 252, a plurality of DC converters 260, a differential 270, and a plurality of power inverter modules 280. The vehicle 200 may further comprise additional components not discussed herein which would be useful in combination with a hybrid vehicle, an electric vehicle, an electric hybrid vehicle, or a fuel-powered vehicle.

In another aspect, the system 400 for estimating the core temperature of at least one cell in a battery 210 in a vehicle 200 at the termination 140 of a rest period 160 comprises at least one sensor 410 configured to measure the surface temperature 100 of the at least one cell in the battery 210. Where the battery 210 comprises a plurality of cells 210a-210h, the surface temperatures 100 of the cells 210a-210h may be measured at the initiation 130 of the rest period 160 and at the termination 140 of the rest period 160 with a plurality of sensors 410. It is understood by one skilled in the art that the sensor 410 may comprise any sensor 410 which is capable of measuring the surface temperature 100 of the cells 210a-210h in a battery 210 and communicating the surface temperature 100 information to the control system 420. In one particular aspect, the sensor 410 comprises a thermistor.

The control system 420 is in signal communication (as indicated in FIG. 2 by a double arrowed line) with the sensor 410, and includes a memory device 430 and a controller 440 in signal communication (also indicated in FIG. 2 by a double arrowed line) with the memory device 430 with instructions for estimating the core temperature 110 of at least one cell in the battery 210 at the termination of the rest period in a manner represented by equations (1) to (3) as set forth above. In one aspect, the memory device 430 may comprise RAM, DRAM, SDRAM, ROM, a flash memory or a static memory. In another aspect, the controller 440 may comprise an integrated circuit, a microchip, a computer, an application-specific integrated circuit (ASIC), or a field programmable gate array (FPGA). In one particular aspect, the memory device 430 and the controller 440 are discrete components which are in signal communication with one another. However, it is understood by one skilled in the art that the memory device 430 and the controller 240 may also form an integral unit.

In a further aspect, the control system 420 is integrated within other systems of the vehicle 200. For example, in one particular aspect, the control system 420 is in signal communication with other systems of the vehicle 200 such that it may convey information related to the estimated core temperature 110 to the systems, which allows such systems to operate the vehicle to maximize performance, efficiency, longevity, and other optimizable parameters. More particularly, conveying information related to the estimated core temperature to various systems in the vehicle may offer the following advantages, including, but not limited to: (1) improving battery availability to improve fuel economy and performance in a vehicle; (2) enhancing power capability estimation; (3) preventing stall conditions in a vehicle; (4) increasing availability of auto start/stop function in a vehicle; (5) improving warranties as transition to various battery wearout failure modes is linked to the core temperature of the cells as opposed to the surface temperature of the cells; (6) estimating the core temperature of the cells independent of the battery cooling system and the thermal system; and (7) improving battery life as the accurate estimation of the core temperature of the cells will lead to optimum use of the battery.

In one aspect, the instructions are written to measure the surface temperatures 100 of the cells 210a-210h at the initiation 130 of the rest period 160 and at the termination 140 of the rest period. In one particular aspect, the surface temperatures 100 are measured at the initiation 130 of the rest period 160 and at the termination 140 of the rest period 160 with a sensor 410 as described above.

In another aspect, the instructions are written to obtain the estimated core temperature 110 of the cell at the initiation 130 of the rest period 160. In one particular aspect, the estimated core temperature 110 is stored on a memory device 430, such that the controller 440 obtains the estimated core temperature 110 from the memory device 430 on which it is stored.

Similarly, in one aspect, the instructions are written to obtain the time required for the surface temperature 100 at the initiation 130 of the rest period 160 and the estimated core temperature 110 at the initiation 130 of the rest period 160 to converge 150. In one particular aspect, the time required for the surface temperature 100 and the core temperature 110 to converge 150 is stored on a memory device 430, such that the controller 440 obtains the time for the surface temperature 100 and the core temperature 110 to converge from the memory device 430 on which it is stored.

In another aspect, the instructions are written to estimate the core temperature 110 at the termination 140 of the rest period 160 based on the measured surface temperatures, the obtained estimated core temperature, and the obtained time in accordance with the relationships expressed in equations (1) to (3).

In another aspect, the instructions are further written to measure the time from the initiation 130 of the rest period 160 to the termination 140 of the rest period 160, such that estimating the core temperature 110 of the cells 210a-210h at the termination 140 of the rest period 160 is based on the measured surface temperatures 100, the obtained estimated core temperature 110, the obtained time 150, and the measured time 160 in accordance with the relationships expressed in equations (1) to (3). In this particular aspect, the system 400 for estimating the core temperature of the cell in a battery 210 further comprises a timing device 450. The timing device 450 may comprise any device capable of measuring the time from the initiation 130 of the rest period 160 to the termination 140 of the rest period 160 as described above. In one aspect, the timing device 450 is in signal communication (as indicated in FIG. 2 by a double arrowed line) with the controller 440.

In one particular aspect, the initiation of the rest period comprises key-off. Similarly, in one aspect, termination of the rest period comprises key-on. In another aspect, the measured time is less than the obtained time.

In yet another aspect, the system 400 for estimating the core temperature of the cells at the termination of the rest period is a real-time estimation; such a real-time estimation provides an accurate portrayal of the core temperature 110 of the cells 210a-210h in a battery 210 at the termination 140 of the rest period 160.

It is also noted that recitations herein of "at least one" component, element, etc., should not be used to create an inference that the alternative use of the articles "a" or "an" should be limited to a single component, element, or related device.

For the purposes of describing and defining the present disclosure it is noted that the terms "about" and "substantially" are utilized herein to represent the inherent degree of uncertainty that may be attributed to any quantitative comparison, value, measurement, or other representation. The terms "about" and "substantially" are also utilized herein to represent the degree by which a quantitative representation may vary from a stated reference without resulting in a change in the basic function of the subject matter at issue.

The above description and drawings are only to be considered illustrative of exemplary embodiments, which achieve the features and advantages of the present disclosure. Modification and substitutions the features and steps described can be made without departing from the intent and scope of the present disclosure. Accordingly, the disclosure is not to be considered as being limited by the foregoing description and drawings, but is only limited by the scope of the appended claims.

What is claimed is:

1. A method for estimating the core temperature of at least one cell in a battery at the termination of a rest period, the method comprising:
    measuring the surface temperature of the at least one cell at the initiation of the rest period and at the termination of the rest period;
    obtaining the estimated core temperature of the at least one cell at the initiation of the rest period;
    obtaining the time required for the surface temperature of the at least one cell at the initiation of the rest period and the estimated core temperature of the at least one cell at the initiation of the rest period to converge;
    measuring the time from the initiation of the rest period to the termination of the rest period; and
    estimating the core temperature of the at least one cell at termination of the rest period based on the measured surface temperatures of the at least one cell at the initiation of the rest period and at the termination of the rest period, the obtained estimated core temperature, the obtained time, and the measured time, wherein the core temperature of the at least one cell at the termination of the rest period is estimated independent of a battery cooling system and/or thermal system.

2. The method of claim 1, wherein the initiation of the rest period comprises key-off.

3. The method of claim 1, wherein the termination of the rest period comprises key-on.

4. The method of claim 1, wherein said method comprises estimating the core temperature of a plurality of cells, wherein obtaining the time required for the surface temperature of the at least one cell at the initiation of the rest period and the estimated core temperature of the at least one cell at the initiation of the rest period to converge comprises:

measuring the time required for the surface temperature of the at least one cell and the estimated core temperature of the at least one cell to converge; and applying the measured time required for the surface temperature of the at least one cell and the estimated core temperature of the at least one cell to converge to a plurality of cells which are similarly situated to the at least one cell, such that the core temperature of a plurality of cells may be estimated.

5. The method of claim 1, wherein the measured time is less than the obtained time.

6. The method of claim 5, wherein the estimated core temperature of the at least one cell at the termination of the rest period is characterized by the following relationship:

$$\left\{T_{est}(t_{off}) = (T_{est}(0) - T_{sur}(0))\left(1 - \frac{t_{off}}{t_{stable}}\right) + T_{sur}(t_{off})\right\}$$

wherein $T_{est}(t_{off})$ is the estimated core temperature of the cells at termination of the rest period, $T_{est}(0)$ is the estimated core temperature of the cells at initiation of the rest period, $T_{sur}(0)$ is the surface temperature of the cells at initiation of the rest period, $t_{off}$ is the rest period, $t_{stable}$ is the time required for the surface temperature of the cells at the initiation of the rest period and the estimated core temperature of the cells at the initiation of the rest period to converge, and $T_{sur}(t_{off})$ is the surface temperature of the cells at termination of the rest period.

7. The method of claim 1, wherein the surface temperature of the at least one cell at the initiation of the rest period and the estimated core temperature of the at least one cell at the initiation of the rest period converge at the ambient temperature.

8. The method of claim 1, wherein the surface temperature of the at least one cell at the initiation of the rest period and the estimated core temperature of the at least one cell at the initiation of the rest period decrease or increase from the initiation of the rest period to the termination of the rest period.

9. The method of claim 1, wherein the surface temperature of the at least one cell at the initiation of the rest period is greater than the estimated core temperature of the at least one cell at the initiation of the rest period.

10. The method of claim 1, wherein the surface temperature of the at least one cell at the initiation of the rest period is less than the estimated core temperature of the at least one cell at the initiation of the rest period.

11. The method of claim 1, wherein the surface temperatures are measured with a sensor configured to measure the surface temperatures.

12. The method of claim 1, wherein the surface temperature of the at least one cell at the initiation of the rest period is less than the estimated core temperature of the at least one cell at the initiation of the rest period and wherein the surface temperature of the at least one cell at the initiation of the rest period and the estimated core temperature of the at least one cell at the initiation of the rest period decrease from the initiation of the rest period to the termination of the rest period.

13. A system for estimating the core temperature of at least one cell in a battery in a vehicle at the termination of a rest period, wherein the vehicle receives at least a portion of its power from the battery, the system comprising:

at least one sensor configured to receive temperature information from the battery; and a control system in signal communication with the sensor, wherein the control system comprises a memory device and a controller in signal communication with the memory device with instructions for estimating the core temperature of at least one cell in the battery at the termination of the rest period, the instructions being written to:

measure the surface temperature of the at least one cell at the initiation of the rest period and at the termination of the rest period;

obtain the estimated core temperature of the at least one cell at the initiation of the rest period;

obtain the time required for the surface temperature of the at least one cell at the initiation of the rest period and the estimated core temperature of the at least one cell at the initiation of the rest period to converge;

measure the time from the initiation of the rest period to the termination of the rest period; and estimate the core temperature of the at least one cell at termination of the rest period based on the measured surface temperatures of the at least one cell at the initiation of the rest period and at the termination of the rest period, the obtained estimated core temperature, the obtained time, and the measured time, wherein the core temperature of the at least one cell at the termination of the rest period is estimated independent of a battery cooling system and/or thermal system.

14. The system of claim 13, wherein initiation of the rest period comprises key-off and wherein the termination of the rest period comprises key-on.

15. The system of claim 13, further comprising a timing device in signal communication with the controller.

16. The system of claim 13, wherein the measured time is less than the obtained time.

17. The system of claim 13, wherein the estimated core temperature of the at least one cell at the termination of the rest period is characterized by the following relationship:

$$\left\{T_{est}(t_{off}) = (T_{est}(0) - T_{sur}(0))\left(1 - \frac{t_{off}}{t_{stable}}\right) + T_{sur}(t_{off})\right\}$$

wherein $T_{est}(t_{off})$ is the estimated core temperature of the cells at termination of the rest period, $T_{est}(0)$ is the estimated core temperature of the cells at initiation of the rest period, $T_{sur}(0)$ is the surface temperature of the cells at initiation of the rest period, $t_{off}$ is the rest period, $t_{stable}$ is the time required for the surface temperature of the cells at the initiation of the rest period and the estimated core temperature of the cells at the initiation of the rest period to converge, and $T_{sur}(t_{off})$ is the surface temperature of the cells at termination of the rest period.

18. A vehicle incorporating the system of claim 13.

* * * * *